(12) United States Patent
Quinger et al.

(10) Patent No.: US 11,509,024 B2
(45) Date of Patent: Nov. 22, 2022

(54) METHOD FOR ARRANGING A CONTACT ELEMENT, CONTACT ELEMENT AND BATTERY STACK

(71) Applicant: LION Smart GmbH, Garching (DE)

(72) Inventors: Daniel Quinger, Herrsching (DE); Christian Behlen, Munich (DE); Tobias Mayer, Munich (DE)

(73) Assignee: LION Smart GmbH, Garching (DE)

( * ) Notice: Subject to any disclaimer, the term of this patent is extended or adjusted under 35 U.S.C. 154(b) by 127 days.

(21) Appl. No.: 16/614,700

(22) PCT Filed: May 11, 2018

(86) PCT No.: PCT/EP2018/062252
§ 371 (c)(1),
(2) Date: Nov. 18, 2019

(87) PCT Pub. No.: WO2018/210699
PCT Pub. Date: Nov. 22, 2018

(65) Prior Publication Data
US 2021/0280951 A1    Sep. 9, 2021

(30) Foreign Application Priority Data

May 18, 2017    (DE) .................... 10 2017 208 395.6

(51) Int. Cl.
*H01M 50/516*    (2021.01)
(52) U.S. Cl.
CPC ...... *H01M 50/516* (2021.01); *H01M 2220/20* (2013.01)

(58) Field of Classification Search
CPC .................. H01M 50/516; H01M 2220/20
See application file for complete search history.

(56) References Cited

U.S. PATENT DOCUMENTS

| | | |
|---|---|---|
| 3,923,549 A | 12/1975 | Mabuchi et al. |
| 2008/0182160 A1 | 7/2008 | Kim et al. |

(Continued)

FOREIGN PATENT DOCUMENTS

| | | |
|---|---|---|
| CN | 202549964 U | 11/2012 |
| CN | 106469799 A | 3/2017 |

(Continued)

OTHER PUBLICATIONS

Machine English translation of DE 102015005529 (Year: 2015).*

(Continued)

*Primary Examiner* — Michael L Dignan
(74) *Attorney, Agent, or Firm* — Ruggiero McAllister & McMahon LLC (57) ABSTRACT

A method arranges a contact element on a battery cell of a battery layer of a battery stack for a battery device of a vehicle. Further, a contact element for a battery cell of a battery layer of a battery stack for a battery device of a device includes a contact plate section, a transition section and a positive pole section. The contact plate section surrounds the transition section and the transition section surrounds the positive pole section. The contact plate section and the positive pole section are arranged at a distance to one another and in parallel or at least substantially in parallel. Still further, battery stack having at least one battery layer with at least one battery cell includes a contact element that is arranged on the battery cell.

10 Claims, 3 Drawing Sheets

(56) References Cited

U.S. PATENT DOCUMENTS

| | | | |
|---|---|---|---|
| 2013/0034751 A1 | 2/2013 | Geng | |
| 2015/0380713 A1* | 12/2015 | Kimura | H01G 11/76 |
| | | | 429/121 |
| 2016/0181579 A1* | 6/2016 | Geshi | H01M 50/502 |
| | | | 429/61 |
| 2017/0001584 A1* | 1/2017 | Harris | B60L 58/21 |
| 2017/0048978 A1* | 2/2017 | Fees | H01G 11/76 |
| 2017/0077487 A1* | 3/2017 | Coakley | H05K 1/189 |
| 2018/0351152 A1* | 12/2018 | Reingruber | H01H 85/00 |
| 2019/0165351 A1* | 5/2019 | Jenner-Braunschmied | |
| | | | H01H 85/143 |

FOREIGN PATENT DOCUMENTS

| | | | |
|---|---|---|---|
| DE | 24 51 332 A1 | 5/1975 | |
| DE | 102015005529 | * 3/2016 | H01M 2/20 |
| DE | 10 2015 005 529 A1 | 11/2016 | |
| DE | 102015215598 A1 | 2/2017 | |
| EP | 2618397 A1 | 7/2013 | |
| EP | 3096377 A1 | 11/2016 | |
| JP | 2015-035360 | * 2/2015 | H01M 4/04 |
| JP | 2015-35360 A | 2/2015 | |
| JP | 2016-66455 A | 4/2016 | |
| WO | 2015/064097 A1 | 5/2015 | |

OTHER PUBLICATIONS

European Office Action dated Oct. 8, 2021 from corresponding European Patent Application No. 18 729 873.2, 8 pages.
German Office Action dated Jan. 8, 2018 from corresponding German Patent Application No. 10 2017 208 395.6, 8 pages.
International Search Report dated Sep. 6, 2018 from corresponding International Patent Application No. PCT/EP2018/062252, with English translation, 5 pages.
Written Opinion dated Sep. 6, 2018 from corresponding International Patent Application No. PCT/EP2018/062252, 6 pages.
Japanese Office Action dated May 31, 2022 from corresponding Japanese Patent Application No. 2020-514324, 5 pages.
Chinese First Office Action dated Dec. 14, 2021 from corresponding Chinese Patent Application No. 2018800327378, 10 pages.

* cited by examiner

METHOD FOR ARRANGING A CONTACT ELEMENT, CONTACT ELEMENT AND BATTERY STACK

The present invention relates to a method of positioning a contact element on a battery cell of a battery level of a battery stack for a battery device of a vehicle. Further, the invention relates to a contact element for a battery cell of a battery plane of a battery stack for a battery device of a vehicle, comprising a contact plate portion, a transition portion and a positive pole portion, wherein the contact plate portion surrounds the transition portion and the transition portion surrounds the positive pole portion, and further wherein the contact plate portion and the positive pole portion are spaced apart from each other and are positioned in parallel or at least substantially parallel. Furthermore, the invention concerns a battery stack comprising at least one battery plane with at least one battery cell, a contact element being positioned on the battery cell.

Electric energy storage devices are widely used in modern technology, for example in electric and/or hybrid vehicles. Possible forms of such energy storage systems are, for example, lithium-ion batteries. In order to increase the performance of such batteries, it is known, for example, that several individual battery cells in one battery level are electrically connected in parallel. Contact plates made of an electrically conductive material such as copper are usually used for this electrically parallel connection. To achieve a further increase, two or more of these battery levels can be connected in series to form a battery stack. In particular, the individual battery levels can be positioned one on top of the other, in particular stacked, and electrically connected. In this way, electrical energy storage devices with a high power density and low packing size can be provided, especially for vehicle battery devices.

According to the state of the art, it is also known to use contact elements to establish an electrically conductive contact between battery cells of two battery levels. Such contact elements are also made of an electrically conductive material, at least in sections. In other words, these contact elements are positioned in particular between two battery cells from two different battery levels. It is known to configure the contact plate of the battery level with receiving openings for one battery cell each, whereby the contact element is on the one hand electrically conductively connected to the contact plate and on the other hand reaches through the receiving opening of the contact plate and makes electrically conductive contact with one pole of the battery cell, preferably a positive pole of the battery cell. The next battery cell can then be placed, preferably with its negative pole, on one side of the contact element, facing away from the contact plate. In this way, a serial connection of the individual battery levels or the battery cells of the battery levels is automatically establish d.

In order to increase the security of a battery stack, it is also known to insert security sections in the contact elements in which a cross-section available for a power line between the battery cells is reduced. This can be provided, for example, by inserting security openings into the contact element. If the electrical load is too high, in particular if the currents flowing are too high, the contact element is melted at this reduced cross-section and the electrically conductive connection is thereby interrupted. An increase in security when using a battery stack with such contact elements can thus be achieved.

According to the state of the art, it is known that the contact elements are completely manufactured and then positioned in the battery level, especially on the contact plate of the battery level. Such a contact element is known, for example, from DE 10 2015 005 529 A1. In order to ensure the mechanical stability of the contact element, it is often intended to place the security openings for creating the security sections with the reduced cross-section in an region of the contact element intended for connecting the contact element to the contact plate. When inserting the security openings, it must also be taken into account that the removal of material from the contact element at this point does not impair the mechanical stability of the entire contact element too much. This represents a limitation of the possible sizes of the applicable security sections and thus of the security that can be provided against, for example, overloading at excessively high currents.

It is the object of the present invention to at least partially eliminate the disadvantages described above. In particular, it is the object of the present invention to provide in a cost-effective and simple manner a method for positioning a contact element, a contact element and a battery stack, by means of which both a positioning of the contact element on a battery cell of a battery level can be simplified, and in particular at the same time restrictions and boundary conditions in the introduction or provision of a security section with a reduced cross-section in the contact element can be reduced.

The preceding object is solved by a method for positioning a contact element with the characteristics of independent claim 1, a contact element with the characteristics of independent claim 11, and a battery stack with the characteristics of dependent claim 16. Further characteristics and details of the invention result from the dependent claims, the description, and the drawings. Features and details which are described in connection with the method according to the invention naturally also apply in connection with the contact element according to the invention as well as the battery stack according to the invention and vice versa in each case, so that with regard to the disclosure, mutual reference to the individual aspects of the invention is or can always be made.

According to a first aspect of the invention, the object is solved by a method of positioning a contact element on a battery cell of a battery level of a battery stack for a battery device of a vehicle. A method according to the invention is characterized by the following steps:

a) Providing a contact element having at least a contact plate portion, a transition portion and a positive pole portion, wherein the contact plate portion surrounds the transition portion and the transition portion surrounds the positive pole portion, and further wherein the contact plate portion and the positive pole portion are spaced apart from each other and positioned parallel or at least substantially parallel, b) Positioning the contact element provided in step a) on the battery cell of the battery plane, wherein when the contact element is positioned, the contact plate portion is positioned on a contact plate of the battery plane and the positive pole portion is positioned on a positive pole of the battery cell of the battery plane; and c) Introduction of at least one security opening in a perforation region of the transition portion to establish at least one security section in the transition portion.

Contact elements are used in battery stacks to electrically connect battery cells of different battery levels. A positive and a negative pole of the individual battery cells of the different battery levels are preferably connected to each other. Terms relating to a positive and a negative pole of a battery cell are interchangeable throughout the application, so that battery cells with reversed polarity can also be connected by a method of positioning a contact element according to the invention. By a method in accordance with the invention, such a contact element may be placed on a battery cell at a battery level, where the battery level is part of a battery stack for a battery device of a vehicle. Such battery stacks can have a large number of battery levels and these battery levels in turn can have a large number of battery cells, so that a large number of such contact elements must be positioned for the manufacture or assembly of a battery stack.

In a first step a) of a method according to the invention, the contact element to be positioned is provided. This contact element comprises at least a contact plate portion, a transition portion and a positive pole portion. The contact plate portion is intended and designed to contact a contact plate of the battery level, in particular to make electrically conductive contact. Such a contact plate allows the battery cells of a battery level to be electrically connected and thus connected in parallel. The positive pole section is the part of the contact element that is configured and intended for electrically conductive contacting of a positive pole of a battery cell. A transition portion is provided between the contact plate portion and the positive pole section in a contact element which can be positioned by a method in accordance with the invention. Thereby the contact plate portion, the transition portion and the positive pole portion are positioned relative to each other such that the contact plate portion surrounds the transition portion and the transition portion surrounds the positive pole portion. The respective surrounding of the individual sections is preferably complete, but can also only be configured as a partial surrounding. In other words, the contact element has a structure which has the contact plate portion on the outside, the positive pole portion on the inside and the transition portion therebetween. Furthermore, the contact plate portion and the positive pole portion are positioned relative to each other in such a way that they are, on the one hand, spaced apart from each other and, on the other hand, positioned parallel or at least substantially parallel to each other. In other words, the contact plate portion and the positive pole section are offset along a depth direction. The depth direction corresponds in particular preferably to the longitudinal extension of the individual battery cells. By positioning the transition portion between the contact plate portion and the positive pole portion, it automatically results that the transition portion has a surface orientation which is not parallel or at least substantially not parallel to the contact plate portion and the positive pole portion. For example, in a contact element that is essentially rotationally symmetrical, the transition portion can be conical. After completion of the first step a) of a method according to the invention, such a contact element is provided and is available for further procedural steps.

In the next step b) of a method according to the invention, the contact element provided in step a) is positioned on the battery cell of the battery level. This positioning is performed in particular by placing the contact plate portion of the contact element on the contact plate of the battery plane. As described above, the contact plate portion is especially configured for this application. At the same time, the positive pole section of the contact element in step b) is positioned on a positive pole of the battery cell of the battery level. Also here, as already described above, the positive pole section is provided and configured accordingly for this application. In particular, the transition portion enables and provides that the contact plate portion and the positive pole portion of an inventive contact element are spaced apart from each other. In this way, a receiving opening in the contact plate, in which the battery cell, in particular the positive pole of the battery cell, is positioned, can be accessed through the positive pole section of the contact element. The contact plate portion of the contact element is positioned on a side of the contact plate facing away from the battery cell, the positive pole section reaches through the opening and can thus contact the positive pole of the battery cell. In particular, once the positioning of the contact element has been completed, an electrically conductive connection can be established between the positive pole and the contact plate of the battery level via the contact element.

In the next step c) of a method according to the invention, at least one security opening is now introduced in a perforation region of the transition portion. The perforation region can fill the entire transition portion or only parts of the transition portion. The introduction of the security opening establishes a security section in the transition portion at the same time. In other words, the security opening represents a hole in the contact element that is no longer available, especially for a line of current between the battery cell and the contact plate. The entire electrical line of the contact element is thus provided in the region of the transition portion only by the at least one security section. The at least one security section thus represents, for example, the region of the contact element in particular which is particularly stressed in the event of an overload and can therefore melt if the load is too high. A protection of the battery cell and thus of the entire battery stack against damage in the event of an overload can thus be provided.

All in all, a method according to the invention has several advantages. In a method in accordance with the invention, it is in particular essential for the invention that the security opening is only introduced into the contact element at a time after the contact element has been positioned on the battery cell of the battery level. This prevents the mechanical stability of the contact element from being impaired by security openings already made during the manufacture of the contact element. The contact element used can therefore be lighter or thinner overall, since the weakening of the mechanical stability due to the security opening does not have to be compensated by the remaining material of the contact element. In addition, a method according to the invention has the advantage that the security section is inserted into a perforation region of the transition portion between the contact plate portion and the positive pole section. This transition portion represents a part of the contact element which is not mechanically stressed or at least only slightly stressed. As the contact element has already been positioned, the security opening can also be introduced in the perforation region of the transition portion in step c) without limiting the size. In this way it is possible to provide particularly small security sections in the contact element. Such a small security section, however, will already melt through at an overload which is smaller than the security sections of the known contact elements of the state of the art. In this way, it is possible, in particular, to ensure that if one of the battery cells behaves incorrectly internally, for example in the event of a short circuit in this battery cell, passivation of this special battery cell can be performed particularly easily, safely and, in particular, automatically. It can also provide increased security against overload damage for the entire battery stack. In summary, the positioning of a contact element can be simplified by a method according to the invention, since the contact elements exhibit greater mechanical stability when positioned. The assembly of the contact element can thus be performed more quickly. In addition, the possibility of particularly small security sections can increase security when operating a battery stack against damage in the event of overload.

Preference may be given to further developing a method in accordance with the invention so that a single security opening is introduced in step c), thereby creating a single security section. In this way, a free cross-section of the security section that is available for the power line can be set particularly easily and with high precision. In addition, the introduction of a single security opening is only one step, so that the entire introduction of the security opening can be simplified. This further development of an inventive method can thus further accelerate the positioning of the contact element, resulting in a reduction of the manufacturing costs of the battery stack.

In addition, a method in accordance with the invention may preferably be further developed in such a way that the security opening is annular in sections, whereby an extension of the security opening above 75%, preferably above 85%, particularly preferred above 95%, corresponds to the extension of a full ring. Such an annular security opening in sections is a particularly preferred design. In particular in the case of a contact element, the transition portion of which is conical, an annular securing opening, at least in sections, represents a favorable configuration. In other words, the security opening in this case is configured as an annular groove. The opening up of the security can extend over a large part of the extension of an enforcement ring, preferably well over 75%, in particular particularly preferred even over 95% of the extension of an enforcement ring. Free cross-sections of the security section for the current flow between the positive pole of the battery and the contact plate of less than 0.1 mm2 can thus be achieved. This can further increase security against overload during operation of the battery stack.

Furthermore, in the case of a method in accordance with the invention, it may be provided that the introduction of at least one security opening in step c) is performed by laser perforation. Laser perforations use laser beams to melt or even vaporize the material of the contact element, especially the perforation region. The use of laser beams can in particular increase the local accuracy of the introduction of the security opening. A particularly precise introduction of the security opening or the security section, in particular also of filigree structures of the security opening or the security section, into the perforation region of the transition portion can thus be provided by the use of laser perforation.

In addition, a method according to the invention can be further developed in such a way that the material of the perforation region is vaporized by the laser perforation, whereby the vaporized material is preferably sucked off. By evaporating the material of the perforation region, it can in particular be avoided that melted material of the perforation region remains uncontrolled on the contact element. Unwanted contact bridges across the security opening formed by the melted material can thus be avoided. The preferred suction of the evaporated material also ensures that the evaporated material is not deposited uncontrolled in the region of the contact element. A particularly clean and safe method of introducing the at least one security opening can be provided in this way.

Further, a method according to the invention may be such that when positioned in step b), the contact plate portion of the contact element is attached to the contact plate and the positive pole portion of the contact element is attached to the positive pole of the battery cell. The attachment of the contact plate portion to the contact plate and the positive pole section to the positive pole represents a mechanical attachment of the respective elements to each other. In this way, a relative positioning of the individual components, in particular the contact element, the contact plate and the battery cell, can be ensured. By securing the mechanical fastening, it can be ensured simultaneously and additionally that an electrically conductive connection is established between the components. In this way, an electrical charge can flow between the contact plate and the positive pole of the battery cell via the contact element.

In addition, a method according to the invention can be further developed in such a way that the contact plate portion of the contact element is attached to the contact plate and the positive pole portion is attached to the positive pole of the battery cell by a fixing device, in particular that the contact plate portion of the contact element is materially welded to the contact plate and the positive pole portion is materially laser welded to the positive pole of the battery cell by a laser device. The preferred cohesive attachment of the individual elements to each other by means of a fastening device avoids in particular the need for additional fastening elements, such as screws, clamps or similar, in order to fasten the contact element to the contact plate or positive pole section. This reduces the mechanical complexity of both the fastening method and the entire battery stack. A laser device can be used particularly preferably for this cohesive attachment, through which the contact plate portion is laser-welded to the contact plate and the positive pole section is laser-welded to the positive pole. This laser welding locally melts the materials of the components involved, i.e. the contact plate portion and the contact plate or the positive pole section and the positive pole, and thus connects them to each other in a cohesive attachment. This represents a particularly simple and therefore preferred cohesive attachment of the contact element to the contact plate and to the positive pole of the battery cell.

A method in accordance with the invention may be particularly preferred to be further developed by using the fastening device used in step b), in particular the laser device, to introduce the at least one security opening in step c). In this way it is possible, for example, to allow the contact element to be fixed to the contact plate and positive pole and the security opening to be inserted without having to change the equipment used in between. The positioning of a contact element can be accelerated in this way. Overall, this time saving in the manufacture and assembly of a battery stack can also save costs. The use of a laser device can also provide the above-mentioned advantages of inserting the security opening by means of a laser perforation.

In addition, the method according to the invention may provide that an insulation volume of the battery plane, which is bounded at least in sections on at least one side by the transition portion, is at least partially filled with an insulation material. Such an insulation volume represents in particular a cavity which is limited at least in sections by the transition portion of the contact element. Further limitations of the insulation volume can be for example the contact plate and the battery cell or also for example an insulation plate of the battery level. Filling the battery at least partially with an insulating material prevents unfilled volumes from remaining in the battery level of the battery stack. By using an insulation material, better electrical insulation can be provided at the same time, and in particular unwanted conduction of current through this insulation volume can be prevented. By filling the insulation volume, mechanical stability of the entire battery stack can also be increased.

In accordance with a preferred further development of a method in accordance with the invention, it may also be provided that the insulation material exhibits at least one of the following properties:
flowable
free-flowing
hardening
dimensionally stable This list is not exhaustive, so that the insulation material may also have other properties, if technically reasonable and possible. The individual properties can be identified individually or simultaneously by the insulation material. It is also possible to demonstrate several of the properties one after the other through the insulation material. For example, a flowable or free-flowing insulation material can be filled into the insulation volume through the security opening in particular, where it then hardens and finally takes on a dimensionally stable form. A manifold filling of the insulation volume by the insulation material can be provided in this way.

According to a second aspect of the invention, the object is solved by a contact element for a battery cell of a battery plane of a battery stack for a battery device of a vehicle, comprising a contact plate portion, a transition portion and a positive pole portion, wherein the contact plate portion surrounds the transition portion and the transition portion surrounds the positive pole portion, and further wherein the contact plate portion and the positive pole portion are spaced apart from each other and positioned parallel or at least substantially parallel. A contact element in accordance with the invention is characterized in that the transition portion has a perforation region for introducing at least one security opening to establish at least one security section.

A contact element according to the invention is intended to provide an electrically conductive connection between a contact plate of a battery level and a positive pole of a battery cell. For this purpose, the contact element has a contact plate portion which is provided and formed for positioning on a contact plate of a battery plane. At the same time, the contact element has a positive pole section which is provided and configured to be positioned on a positive pole of a battery cell. The contact plate portion surrounds the positive pole portion with a transition portion disposed between the contact plate portion and the positive pole portion. Thus, for example, in an at least substantially rotationally symmetrical configuration of a contact element, the contact plate portion is positioned externally and the positive pole portion is positioned internally, the transition portion being between the contact plate portion and the positive pole portion. The contact plate portion preferably completely surrounds the transition portion, but can only partially surround it. The same applies to the transition portion and the positive pole section, so that the transition portion preferentially completely surrounds the positive pole section, but can also only partially surround it. In addition, the contact plate portion and the positive pole portion are provided on the contact element such that they are spaced apart from each other and are positioned parallel or at least substantially parallel to each other. In other words, the contact plate portion and the positive pole portion are spaced apart from each other in a depth direction, the depth direction preferably corresponding at least substantially to the longitudinal extent of the battery cell. This means in particular that the transition portion extending between the contact plate portion and the positive pole portion has a surface orientation which is not plane parallel or at least substantially not parallel to the contact plate portion and the positive pole portion. If a contact element is at least essentially rotationally symmetrical, the transition portion, for example, may preferably be conical. In this way, it can be provided that the contact plate portion contacts the contact plate of the battery plane on one side and the positive pole portion engages a positioning opening of the contact plate in which the battery cell is positioned.

Essential to the invention is the fact that a contact element in accordance with the invention has a transition portion which has a perforation region for introducing at least one security opening to establish at least one security section. In particular, it may be provided that this introduction of the at least one security opening only takes place when the contact element is already positioned, preferentially fastened, on the contact plate and the battery cell. In this way, the contact element can be positioned on the battery cell and on the contact plate as a stable component, especially without security openings. The security opening is not established until this positioning has been completed in the perforation region of the transition portion. In particular, the transition portion preferably represents an region of the contact element that is subject to little mechanical stress, as the contact element is preferably attached to the contact plate in the contact plate portion and the positive pole section is attached to the positive pole. In this way, the contact element can be made mechanically simpler and, for example, lighter. Furthermore, there are no restrictions on the security opening and the at least one security section due to specifications given by the positioning or mounting of the contact element on the battery level. A better adaptation of at least one security opening and at least one security section to the requirements of the electrical power to be protected can thus be made possible. All in all, this simplifies the assembly of a contact element in accordance with the invention on a battery cell and at the same time increases the security when operating a battery stack with such contact elements.

It may be particularly preferable for the contact element according to the invention that the contact element is positioned using a method according to the first aspect of the invention. In this way, all the advantages which have already been described in detail in relation to a method under the first aspect of the invention arise, of course, also for a contact element which has been ordered using such a method under the first aspect of the invention.

In addition, in the case of a contact element according to the invention, it may be provided that the perforation region consists at least in sections of an evaporable material. In this way it can enable that the introduction of the security opening is performed by evaporation of this evaporable material. In particular, in contrast to simple melting, for example, there is no waste material which, in the worst case, establish s an unwanted conductive connection between the contact plate and the positive pole, for example. It may be particularly preferred that the evaporable material is only present at those points of the perforation region where the security opening is to be inserted. For example, the transition portion in the region of the perforation region can be particularly thin in order to establish evaporable material there. A particularly simple introduction of the security opening into the transition portion can thus be provided.

A contact element in accordance with the invention may also be configured such that, in a position of the contact element positioned on the battery cell of the battery plane, the transition portion at least on one side at least in sections delimits one side of an insulation volume of the battery plane. Such an insulation volume can preferably be filled with an insulation material. Other sides of the insulation volume can be limited by the contact plate, the battery cell and/or an insulation plate of the battery level, for example. Such an insulation volume, in particular an insulation volume filled with an insulation material, can provide even better insulation between the contact plate and, for example, the battery cell. In particular, this can prevent unfilled volumes from being present in the battery level. By filling the insulation volume, the mechanical stability of the entire battery stack can be increased.

Furthermore, it may be provided in the case of the contact element according to the invention that the contact element has fastening means, in particular fixing clamps, for fastening a negative pole of a battery cell of a further battery plane of the battery stack, the fastening means preferably being positioned on the contact plate portion. In this way it is particularly easy to provide stackability of the individual battery levels of the battery stack. By providing fasteners on the contact element, an integration of the fastening of the battery cells of the next battery level in particular can already be provided by the contact element. This can increase the compactness of a battery stack.

According to a third aspect of the invention, the object is solved by a battery stack comprising at least one battery level with at least one battery cell, a contact element being positioned on the battery cell. A battery stack according to the invention is characterized in that the contact element is formed according to one of the claims according to the second aspect of the invention and/or is positioned on the battery cell according to a method according to the first aspect of the invention. In this way, a stack of batteries in conformity with the invention can provide the same advantages as have already been described in detail in relation to a contact element under the second aspect of the invention and/or in relation to a method under the first aspect of the invention.

Further advantages, features and details of the invention result from the following description, in which embodiments of the invention are described in detail with reference to the drawings. The features mentioned in the claims and in the description may be essential to the invention either individually or in any combination.

The explanation of the embodiments describes the present invention exclusively in the context of examples. Of course, individual features of the embodiments can be freely combined with each other, if technically reasonable, without leaving the scope of the present invention. Elements with the same function and mode of action have the same reference signs in the figures. They are shown schematically:

Figure 1:
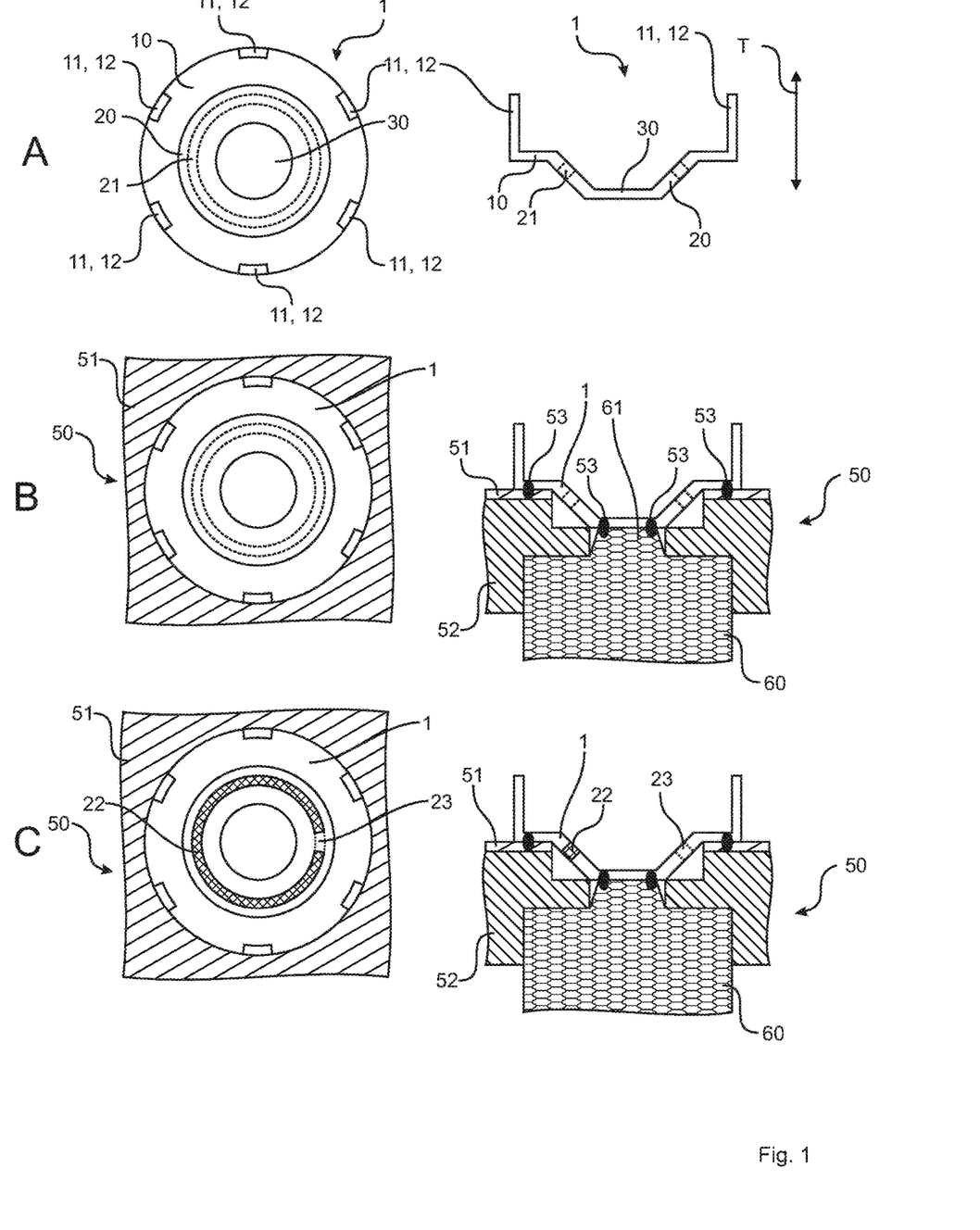
FIG. 1 A method according to the invention for positioning a contact element according to the invention, FIG. 2 a battery stack according to the invention, and FIG. 3 another embodiment of a contact element according to the invention.

FIG. 1 shows the steps of a method according to the invention for positioning a contact element 1 on a battery cell 60. The battery cell 60 is part of a battery level 50 of a battery stack 40 (not shown in each case) for a battery device of a vehicle. On the left side there is a top view of contact element 1, on the right side a sectional view. The top figure shows step a) of a method according to the invention and is designated as A. The middle illustration shows step b) of a method according to the invention and is correspondingly designated B. In addition, the bottom figure shows step c) of a method according to the invention and is designated C. In the individual illustrations, only newly appearing elements are provided with reference signs to improve clarity.

In step a) of a method according to the invention, a contact element 1 is provided. In the illustrated embodiment of the contact element 1 it has in particular a contact plate portion 10, a transition portion 20 and a positive pole section 30. The positive pole section 30 is surrounded by the transition portion 20, which in turn is surrounded by the contact plate portion 10. In this essentially radially symmetrical embodiment according to the invention invented contact element 1, the transition portion 20 is conical. This makes it particularly easy to ensure that the contact plate portion 10 and the positive pole section 30 are spaced apart from each other, especially along a depth direction T. The depth direction T corresponds in particular to a longitudinal extension of the battery cell 60. At the same time, the contact plate portion 10 and the positive pole section 30 are positioned essentially parallel to each other. Transition portion 20 also has a perforation region 21, into which a security opening 22 and thereby a security section 23 will be introduced later in step c) of a method according to the invention. At the edge of the contact plate portion 10 there are fixing clamps 12 formed fixing means 11. These are used to attach another battery cell 60 to another battery level 50 (not shown).

In the next step b) of a method according to the invention, the contact element 1 provided is positioned on the battery cell 60. This positioning is performed in particular such that the positive pole portion 30 is positioned on a positive pole 61 of the battery cell 60 and at the same time the contact plate portion 10 is positioned on a contact plate 51 of the battery level 50. Battery cell 60, for example, can also be located or positioned in an insulation plate 52 of battery level 50. As shown, the contact plate portion 10 can preferably be attached to the contact plate 51 and the positive pole section 30 to the positive pole 61 to the mounting points 53. This fastening is particularly preferred by a cohesive attachment device, particularly preferred by laser welding, which is performed by a laser device. A particularly secure, mechanical hold of contact element 1 on both contact plate 51 and positive pole 61 of battery cell 60 can thus be provided. Furthermore, ensuring an electrically conductive connection between the positive pole 61 and the contact plate 51 via contact element 1 is particularly easy with this mechanical fastening.

In the final step c) of a method in accordance with the invention, a security opening 22 is introduced in a perforation region 21 of transition portion 20. This automatically establish s a securing section 23. As shown, it is preferable to establish exactly one securing opening 22 and thus exactly one securing section 23. Alternatively, several security openings 22 and thus several security portions 23 can be establish d. It may also be particularly preferable to use the same fixing device, in particular the laser device, used in step b) for fixing the contact element 1 at the fixing points 53 with the contact plate 51 or the positive pole 61, respectively, to insert the security opening 22. The attachment of contact element 1 can thus be simplified overall. During the introduction of the security opening 22, the material of the perforation region 21 is vaporized and suctioned off particularly preferentially. For this purpose, it may be provided that the perforation region 21 consists at least in sections of an evaporable material. A contamination of the contact element 1 by the evaporated material can be avoided by suction. As shown, the securing opening 22 may preferably extend in an annular manner at least in sections in transition portion 20. In this form, the opening of a security extends over 95% of the extension of an enforcement ring. The securing section 23 can therefore be particularly small. The security section 23 may have a cross-section for a current flow of less than 0.1 mm², which is particularly preferred. A particularly good protection against overload can be provided in this way, since if the current flow through security section 23 is too high, it melts and the electrical connection between the positive pole 61 and the contact plate 51 is interrupted.

Altogether, the use of a method in accordance with the invention can simplify the positioning of a contact element 1 on a battery cell 60 of a battery level 50. In particular, in that the security opening 22 is only introduced into contact element 1 when this is already positioned, preferably fastened, on battery cell 60, it can be provided that contact element 1 can be configured to be simpler and more mechanically stable overall. Restrictions and boundary conditions, which are justified during the planning of security section 23 due to mechanical considerations regarding the stability of the entire contact element 1, can also be omitted by the use of an inventive method.

Figure 2:
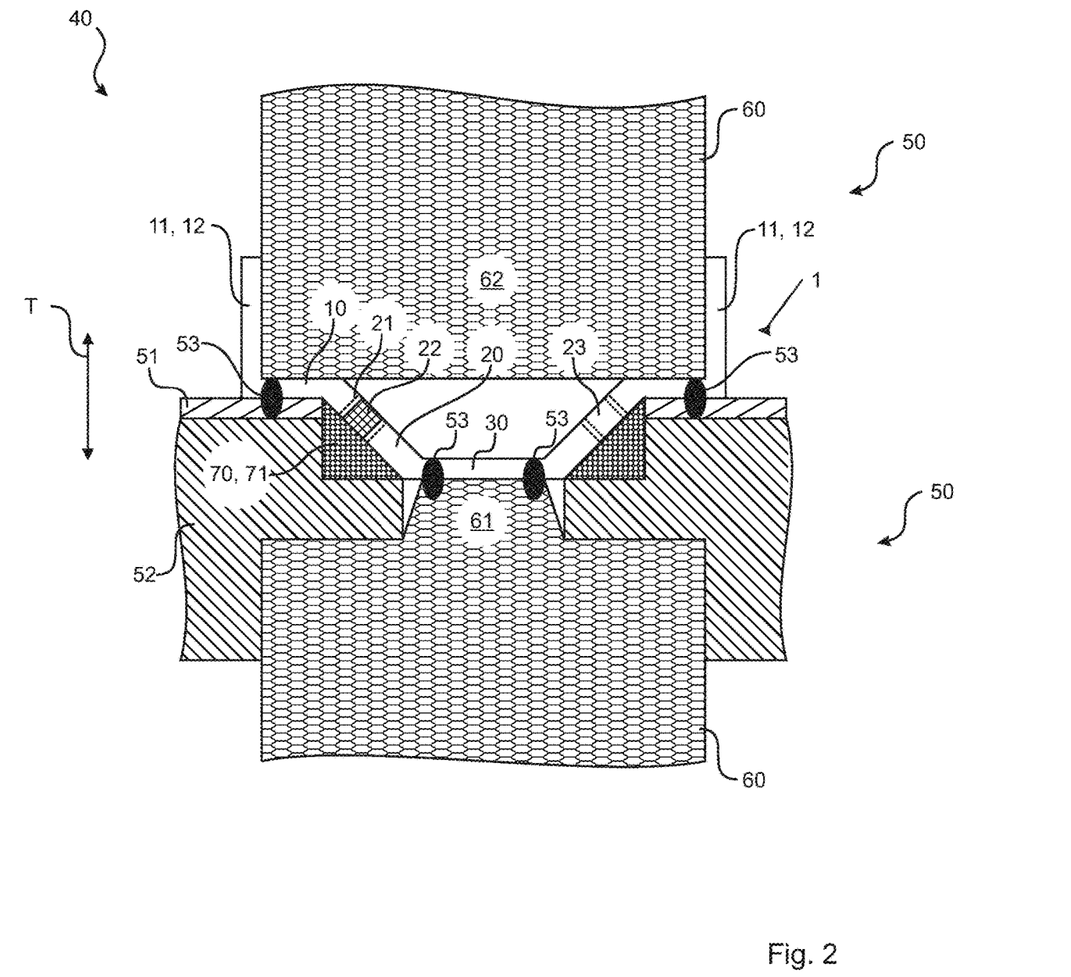

FIG. 2 shows a section of a battery stack 40 according to the invention. In particular, two battery levels 50 and one battery cell 60 of each are shown. A contact element 1 according to the invention provides an electrically conductive connection of a positive pole 61 of one battery cell 60 to the negative pole 62 of the battery cell 60 in the further battery level 50. The contact element 1 is connected to a contact plate 51 of the lower battery level 50 and to the positive pole 61 of the corresponding battery 60 at fixing points 53. The battery cell 60 of the upper battery level 50 is held in place by 12 fixing clamps 11, which are especially positioned on the contact plate portion 10 of contact element 1. The stackability of the individual battery levels 50 of the battery stack 40 along a depth direction T, which corresponds to a longitudinal extension of the battery cells 60, can thus be provided particularly easily. Contact element 1 has in particular a contact plate portion 10, a positive pole section 30 and a transition portion 20 positioned between them. Since the contact plate portion 10 and the positive pole section 30 are spaced apart along the depth direction T, the transition portion 20 also extends at least partially along the depth direction T, in the shown configuration the transition portion 20 is particularly conical. An insulation plate 52 further ensures a mechanically stable positioning of the battery 60 and at the same time electrical insulation. Essentially, a perforation region 21 is provided in the transition portion 20, which is subjected to little mechanical stress, in which a securing opening 22 and thus a securing section 23 are introduced. In accordance with the invention, this introduction of the security opening 22 only takes place when contact element 1 is already preferably fixed to contact plate 51 or positive pole 61 according to a method in accordance with the invention. In this way, contact element 1 can be configured to be particularly simple mechanically, which can also provide, for example, a reduction in the thickness of contact element 1. Boundary conditions for planning security section 23, which merely aim at mechanical stability of contact element 1, can also be avoided. The configuration of security section 23 is therefore only performed for reasons that take electrical security into account, for example against overload. This can increase security when operating a battery stack 40. Furthermore, FIG. 2 shows an insulation volume 70 which is limited at least in sections by the transition portion 20 of contact element 1. Further sides of the insulation volume 70 are, for example, the contact plate 51 and the insulation plate 52. The insulation volume 70 is also filled with an insulation material 71, which is flowable or free-flowing during filling, for example, and then cures and finally fills the insulation volume 70 with dimensional stability. In this way, better electrical insulation can be provided between the battery 60 and the contact plate 51. On the other hand, the mechanical stability of the battery stack 40 can be increased by filling cavities.

Figure 3:
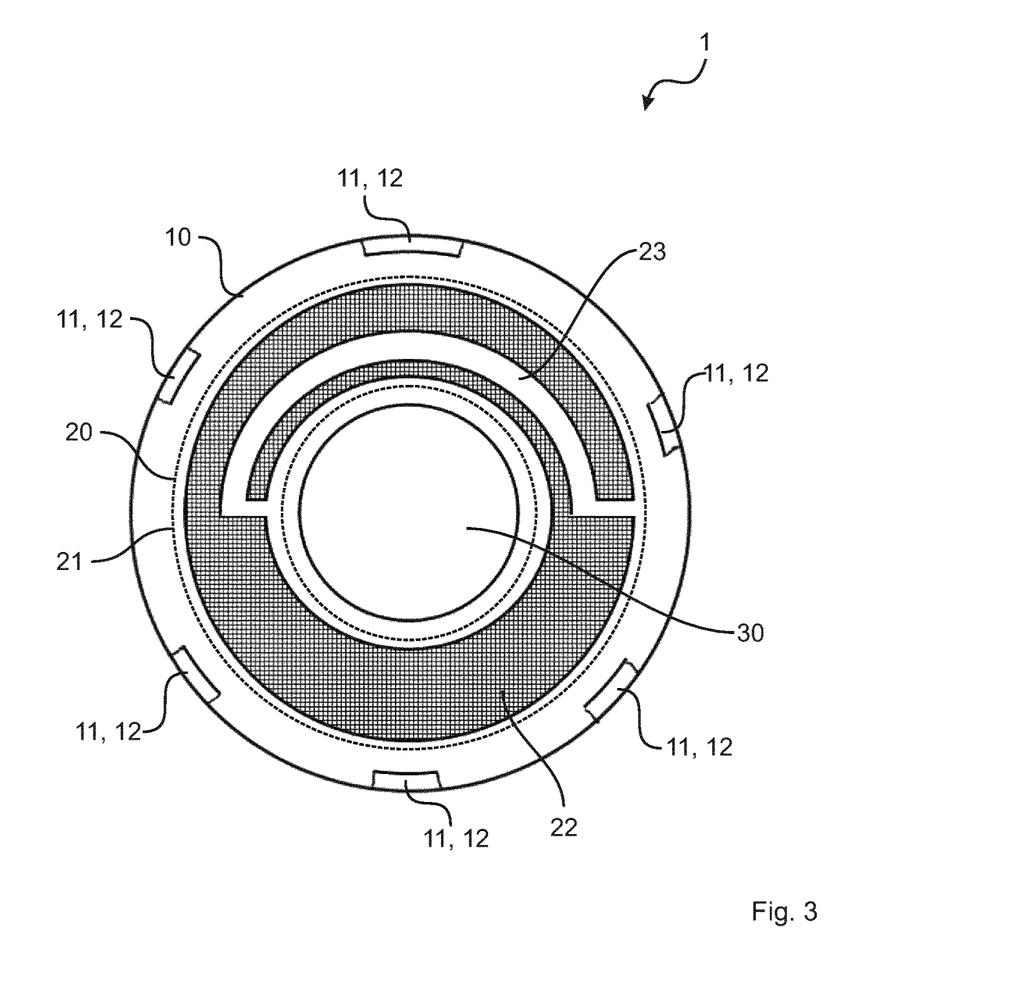

FIG. 3 shows another possible embodiment of a contact element 1 according to the invention. Even in this embodiment, contact element 1 is at least essentially rotationally symmetrical. A plan view of the inventive contact element 1 is shown. It is also clearly visible in this configuration that the contact plate portion 10 surrounds the transition portion 20, which in turn has a perforation region 21 for the positioning of a security opening 22 and a security section 23. In addition, the transition portion 20 surrounds the positive pole section 30 and the outer edge of the contact plate portion 10 is also provided with fastening means 11, also in the form of fixing clamps 12. In comparison, for example, with the design of an inventive contact element 1 shown in FIG. 1, the security opening 22 and the security section 23 are now configured differently in this embodiment. In this embodiment, for example, it is provided that the security section 23 essentially comprises the positive pole section 30 in a semicircle. In other words, the contact points between the security section 23 and the contact plate portion 10 and the security section 23 and positive pole section 30 are opposite each other with respect to the center of contact element 1. A securing section 23 with a large longitudinal extension can thus be provided particularly easily. This makes it particularly easy to ensure that security section 23 melts through when the current load is too high, for example. It is also possible to configure the security section 23 in such a way that it at least essentially also has spring properties. When the contact element 1 is positioned on a contact pad 51 and a positive pole 61 of a battery cell 60 (not shown), the positive pole section 30 can be pressed against the positive pole 61 of the battery cell 60 by the spring action of the security section 23. This already ensures that the positive pole section 30 is securely connected to the positive pole 61 of the battery cell 60. It can also be used to simplify the attachment, in particular welding, of the positive pole section 30 to the positive pole 61 of the battery cell 60 by means of a laser device.

REFERENCE SIGNS

1 Contact element
10 Contact plate portion
11 Fastening agents
12 Fixing clamp
20 Transition portion
21 Perforation region
22 Security opening
23 Securing section
30 Positive pole section
40 Battery stacks
50 Battery level
51 Contact plate
52 Insulation plate
53 Fastening point
60 Battery cell
61 Positive pole
62 Negative pole
70 Insulation volume
71 Insulation material
T Depth direction

The invention claimed is:

1. A method for arranging a contact element on a battery cell of a battery plane of a battery stack for a battery device of a vehicle, the method comprising the following steps:
   a) providing a contact element having at least a contact plate portion, a transition portion and a positive pole portion, wherein the contact plate portion surrounds the transition portion and the transition portion surrounds the positive pole portion, and further wherein the contact plate portion and the positive pole portion are spaced apart from each other and are arranged parallel or at least substantially parallel,
   b) arranging the contact element provided in step a) on the battery cell of the battery plane, wherein when the contact element is positioned, the contact plate portion is positioned on a contact plate of the battery plane and the positive pole portion is positioned on a positive pole of the battery cell of the battery plane; and
   c) introducing at least one security opening after steps a) and b) to increase the mechanical stability of the contact element into a perforation region of the transition portion to establish at least one security section in the transition portion,
   wherein the security section is formed so that the security section can be melted to provide security when subjected to high loads.

2. The method according to claim 1, wherein in step c) a single security opening is introduced and thereby a single security section is established.

3. The method according to claim 2, wherein the security opening is annular in sections, and wherein the security opening has an extension that corresponds to over 75% of an extension of a full ring of the transition portion.

4. The method according to claim 1, wherein the introducing the at least one security opening in step c) is performed by laser perforation.

5. The method according to claim 4, wherein the perforation region has material that is evaporable by the laser perforation.

6. The method according to claim 1, wherein, when positioned in step b), the contact plate portion of the contact element on the contact plate and the positive pole portion of the contact element is fixed to the positive pole of the battery cell.

7. The method according to claim 6, wherein the contact plate portion of the contact element is attached to the contact plate and the positive pole portion is attached to the positive pole of the battery cell by a securing device.

8. The method according to claim 7, wherein the securing device is used for introducing the at least one security opening in step c).

9. The method according to claim 1, wherein the battery plane has an insulation volume, which at least on one side is delimited at least in sections by the transition portion, is at least partially filled with an insulation material.

10. The method according to claim 9, wherein the insulating material has at least property selected from the group consisting of: flowable, free-flowing, hardening, and dimensionally stable.

* * * * *